United States Patent [19]
Obeissart

[11] Patent Number: 4,478,487
[45] Date of Patent: Oct. 23, 1984

[54] OPTICAL FIBER CONNECTORS

[75] Inventor: Albert Obeissart, Estrees S/Denis, France

[73] Assignee: Souriau & Cie (SA), Boulogne, France

[21] Appl. No.: 379,328

[22] Filed: May 18, 1982

[30] Foreign Application Priority Data

| May 19, 1981 | [FR] | France | 81 09900 |
| Jun. 26, 1981 | [FR] | France | 81 12574 |
| Jul. 23, 1981 | [FR] | France | 81 14321 |
| Oct. 23, 1981 | [FR] | France | 81 19900 |

[51] Int. Cl.³ .............................................. G02B 7/26
[52] U.S. Cl. ............................... 350/96.21; 350/96.20
[58] Field of Search ............... 350/96.20, 96.21, 96.22

[56] References Cited

U.S. PATENT DOCUMENTS

| 4,166,668 | 9/1979 | MacLeod | 350/96.2 |
| 4,184,742 | 1/1980 | Corrales | 350/96.21 |
| 4,218,113 | 8/1980 | Uberbacher | 350/96.21 |

FOREIGN PATENT DOCUMENTS 1458897 12/1976 United Kingdom ............... 164/198

Primary Examiner—William L. Sikes
Assistant Examiner—Akm E. Ullah
Attorney, Agent, or Firm—McAulay, Fields, Fisher, Goldstein & Nissen

[57] ABSTRACT

A connector for two optical fibers having at least one body composed of a one-piece member with an axial bore, a ferrule supporting an optical fiber in the bore, the axial bore being defined by two coaxial cylindrical surfaces of revolution having different diameters, two ferrules supporting in an internal bore the two fibers, the two ferrules each being defined by an external cylindrical surface of revolution complementary to that of the one-piece member having the smaller diameter, at least one first sleeve mounted around the first of the ferrules; first elastic linking means between the sleeve and the first ferrule, the sleeve being defined externally by a cylindrical surface of revolution complementary to that of the body member having the larger diameter, these two ferrules being introduced into the body member such that, firstly, they are positioned at least partially in the axial bore of the smaller diameter and, secondly, such that the sleeve is placed in the axial bore of larger diameter. Also disclosed is an optical fiber cable comprising at least one of the disclosed connector and a method for allowing the connection of at least one optical fiber surrounded by a relatively flexible sheath to a ferrule and apparatus for carrying out the method.

43 Claims, 15 Drawing Figures

OPTICAL FIBER CONNECTORS

The present invention relates to connectors for at least two optical fibers.

It is known that there is a very clear present tendency to replace electrical conduction cables by optical conduction cables, essentially to minimize the weight of the cables used while increasing the information density transmission possibilities.

It is however quite evident that optical fibers cannot be made in indefinite lengths and that moreover connections between them cannot be made in the same manner and with as much ease as an electrical conductor.

Maximum precautions must consequently be taken in the design of these connectors.

The main feature of such a connector must be that, whatever the action to which it may be subjected, either voluntarily or involuntarily, due to spurious or other phenomena, the ends of the two optical fibers must be constantly opposite each other so that all the light transmitted by one fiber is received by the next fiber so that there is a minimum transition loss at the interface between these fibers.

Among prior-art connectors, there is at least one which includes a central body member made up of a clip forming a triangular section whose walls are sufficiently elastic.

In this case, the two ends of the optical fibers are maintained in ferrules which are introduced through the two ends of the clip so that the two optical fibers are opposite each other.

There are of course a certain number of embodiments for these clips, but they all have one drawback. Owing to their elasticity, there is never a real reproducibility of their configuration among all the clips and, moreover, the two ends do not have the same section, so that it is never sure that the two optical fibers abut perfectly and remain abutted with time.

OBJECTS AND SUMMARY OF THE INVENTION

It is thus an object of the present invention to provide an optical fiber connector avoiding the above-mentioned drawbacks and offering the desired level of reliability to ensure good transmission between two optical fibers, and moreover presenting a structural configuration which allows easy, industrial—i.e. large-scale—manufacture while conserving very good reproducibility.

It is also an object of the invention to provide a connection for optical fiber cable connectors making it possible to ensure the continuity of all the cables, this connection providing full reliability without requiring any special precautions for these connections.

Another object of the invention is a method for the connection of optical fibers surrounded by a sheath with a ferrule and the means for the implementation of the method.

More precisely, the present invention provides a connector for two optical fibers, comprising at least one body composed of a one-piece member in which is made an axial bore, a ferrule supporting an optical fiber in said bore, wherein said one-piece member has an axial bore defined by two coaxial cylindrical surfaces of revolution having different diameters, two (first and second) ferrules supporting in an internal bore the said two fibers respectively, these two ferrules each being delimited respectively by an external cylindrical surface of revolution complementary to that of the one-piece member having the smaller diameter, at least one first sleeve mounted around a first of said ferrules with a certain clearance, first elastic linking means between said sleeve and said first ferrule, said sleeve being delimited externally by a cylindrical surface of revolution complementary to that of said body member having the larger diameter, these two ferrules being introduced into said body member such that, firstly, they are positioned at least partially in said axial bore of smaller diameter and, secondly, such that the sleeve is placed in said axial bore of larger diameter.

The invention also provides a connector for two optical fibers comprising a body composed of a one-piece member having an axial bore defined by two coaxial cylindrical surfaces of revolution having two different diameters, two (first and second) ferrules supporting said two fibers respectively in an internal bore, these two ferrules being delimited respectively by an external cylindrical surface of revolution complementary to that of said axial bore having the smaller diameter, at least one first sleeve mounted around a first of said ferrules with a certain clearance, first elastic linking means between said sleeve and said first ferrule, said sleeve being delimited externally by a cylindrical surface of revolution complementary to that of said body member having the largest diameter, said two ferrules being introduced into said body members so that, firstly, it is positioned at least partially in said axial bore of smaller diameter and, secondly, so that the sleeve is placed in said axial bore of larger diameter, this connector being characterized by the fact that said body member has a second axial bore delimited by at least a third surface of revolution in which can slide a third ferrule delimited by an external cylindrical surface of revolution having the same diameter as said first and second ferrules, the diameter of said third surface being greater than that of said third ferrule.

It is also an object of the present invention to provide a method for achieving the connection of a least one optical fiber surrounded by a relatively flexible sheath with a ferrule and consisting in:

making in said ferrule a first axial bore, a first end of which has a section slightly larger than that of said fiber, and the second end of which has a continuously evolving section larger than the maximum section of the sheath, removing part of said sheath on one end of said fiber, introducing said fiber with said sheath into said axial bore so that the bared end is located in said first end and said fiber covered with its sheath is in said second end of said axial bore, securing the bared end of said fiber with said ferrule, and inserting into said second end a wedge surrounding said sheath, said wedge having an external shape substantially complementary to that of said second end, said wedge being inserted into said second end by squeezing, at least partially, said sheath to clamp it and secure it to said ferrule.

The present invention also provides an apparatus for the implementation of above-described method, this apparatus being characterized in that it includes means for bearing against said ferrule, means for bearing against said wedge, and means for exerting two forces in opposition tending to bring said ferrule and said wedge together.

Another object of the present invention is an optical fiber termination surrounded by a sheath, characterized in that it comprises:

a ferrule including an axial bore with a first end having a section slightly larger than said fiber and whose second end has a continuously evolving section larger than the section of said sheath, said fiber having one bared end placed in said axial bore at the level of said first end, part of said fiber surrounded by its sheath being located at the level of said second end, and a wedge surrounding said sheath located in said second end, said wedge having a section complementary to that of said second end and a second bore surrounding said sheath, said wedge bearing on the wall of said axial bore and squeezing, at least partially, said sheath to keep it connected to said ferrule.

BRIEF DESCRIPTION OF THE DRAWING

Other characteristics and advantages of the present invention will appear from the following description given with reference to the appended drawings in which.

DISCLOSURE OF BEST MODE

Figure 1:
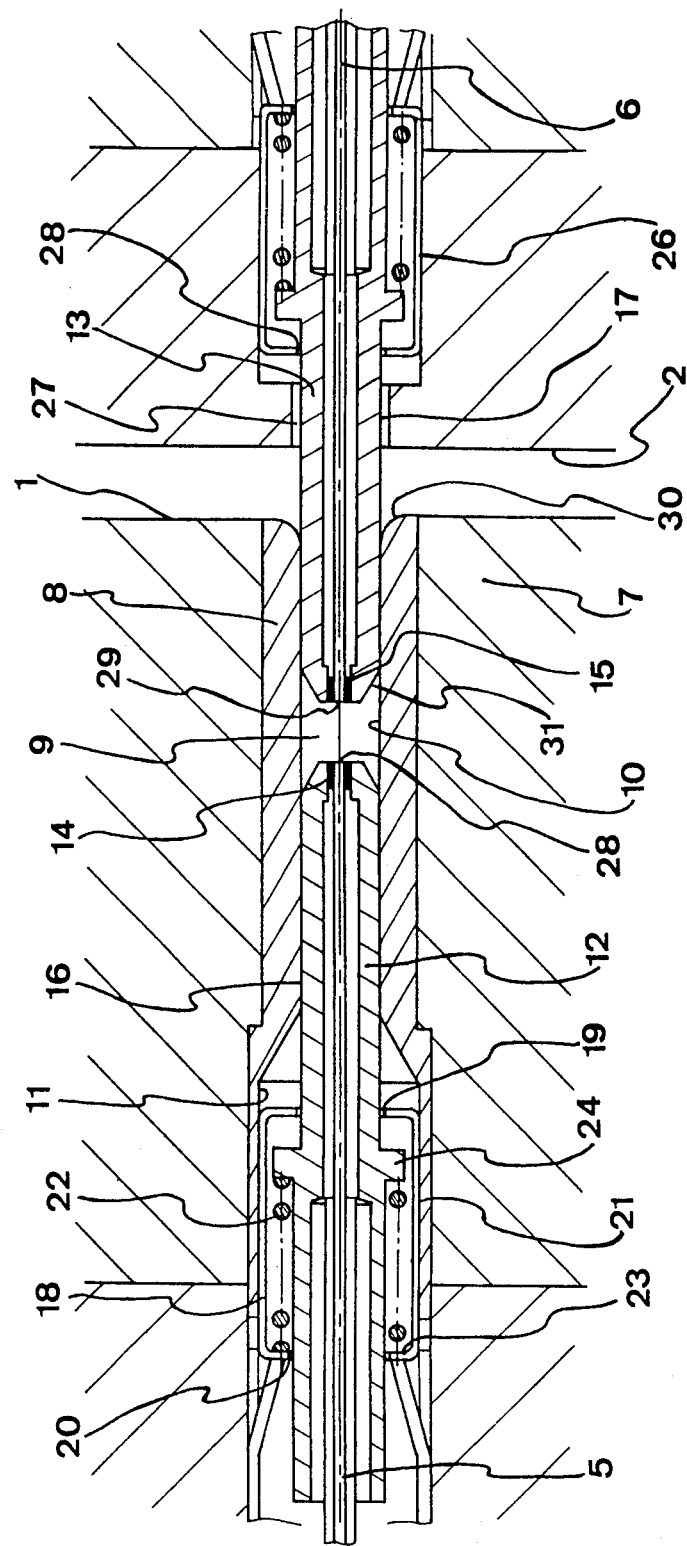
FIG. 1 represents, in section, an embodiment of a connector for two fibers according to the invention.

In FIG. 1 is shown a sectional view of part of an embodiment of a connector for at least two optical fibers.

This connector is made up essentially of two parts 1, 2 capable of mating with each other by means of connection means not shown in the figure because they are known in themselves, particularly in the field of connectors, whether optical fiber connectors or electrical connectors.

Each part or pin 1, 2 is made up of a body member, each supporting one optical fiber 5, 6.

More precisely, the body member 7 of the part 1 comprises essentially a one-piece member 8 having an axial bore 9 defined by two coaxial cylindrical surfaces of revolution 10 and 11 respectively, necessarily having two different diameters, the surface 10 being that which has the smaller diameter.

The two fibers 5 and 6 are maintained respectivley in two ferrules 12, 13 by means of adhesives 14, 15 for example.

These ferrules are made up, at least partially, of a cylinder of revolution whose external surface 16, 17 is a cylindrical surface of revolution having the same diameter as the internal surface 10 of the previously described ferrule, so that these two ferrules 12, 13 can penetrate into this axial bore 9 and can match at least partially this internal surface 10 since the external surfaces of these ferrules are complementary to the internal surface 10 of the axial bore 9.

Furthermore, at east one ferrule, in particular the ferrule 12, is surrounded by a sleeve 18 (with a certain clearance 19 and 20 between the ferrule and the sleeve) so that the external surface 21 of this sleeve is complementary to the internal surface 11 of the axial bore 9.

The sleeve is connected to this ferrule 12 by elastic means 22 consisting for example of a spring bearing respectively on the internal wall 23 of the sleeve 21 and a shoulder 24 integral with the ferrule 12.

Owing to the clearance 19 and 20 and the elastic means 22, the ferrule 12 can offer a relatively limited lateral degree of freedom, and a longitudinal degree of freedom defined by the travel which the shoulder 24 can effect between the total extension of the spring 22 and the length it has when it is completely relaxed. It is thus seen that when the ferrule is introduced into this body member 8, the two surfaces 16 and 10 being perfectly machined using boring techniques make it possible to keep this ferrule 12 correctly positioned in the axial bore 9.

Similarly, the sleeve will be held perfectly by the surface 11 and, owing to the slight transverse clearance, will not present any positioning difficulty, the ferrule and the sleeve both being introduced easily into the body member 8.

Furthermore, advantageously, the ferrule 12 and the sleeve 8 will both be made of the same meterial or at least of materials having equal or very similar coefficients of expansion.

Likewise, the other ferrule 13 advantageously has the same configuration as the ferrule 12 in order to design the maximum number of components with the same configuration and, accordingly the sleeve 26 is the same as the sleeve 18.

Consesquently, the part 2 will include a recess for this sleeve 26, it being understood that the part of the ferrule 13 emerging from the part 2 will be freed from the latter by a clearance 27 at least equal to if not larger than the clearance 28 permitted transversely between this ferrule 13 and the sleeve 26.

To accomplish the connection between the two optical fibers 5 and 6, the two parts 1 and 2 are brought together so that, if the ferrule 12 is considered to be in its position as shown in the figure, it is the ferrule 13 which penetrates into the axial part 9, perfectly matching the internal part 10, and consequently is positioned opposite the ferrule 12 so that the ends 28 and 29 of the two optical fibers 5 and 6 are perfectly opposite each other.

It is to be pointed out that in this connector the ferrule 12 is kept constantly in position in the body member 8 but that, on the other hand, for connections or disconnections, the ferrule 13 forms a male part which can be extracted or inserted many times into this axial bore 9, the two optical fibers always abutting correctly.

This insertion is facilitated by the funnel shape of the end 30 of the body member 8 and by a conical end 31 of the ferrule 13.

The connection will thus be perfect and the different clearances described previously will allow these connections to be made very easily.

The advantage of such an apparatus can be seen, because it makes it possible to produce optical fiber connectors for a multitude of optical fiber pairs on the same connector which will all be identical.

It is thus apparent in this case that this type of connector is perfectly advantageous because it is made up essentially, as regards the components requiring a certain degree of precision, of parts produced by boring or drilling which are machining operations offering the desired level of precision. Furthermore, it allows the simultaneous connection, with great accuracy and dependability, of a plurality of optical fiber cables with only two supports.

Advantageously, the ferrules in which are held the optical fibers will be inserted respectively into these two parts 1 and 2 and will be maintained by blocking means such as those shown at 33 and which are made up essentially of spring leaves which, after having been compressed when the ferrule is introduced by the passage of the sleeve, relax once the sleeve has passed in order to take up a position abutting behind this sleeve preventing it from moving back.

Thus, when the two parts 1 and 2 are connected so that the two optical fibers are mated, the position of these two sleeves is perfectly defined and any defects as regards the length of the ferrules in particular will be very easily absorbed by their displacement under the action of the springs 22. So that the ends 28 and 29 of these two optical fibers are always in contact since the springs are in opposition and the surface 10 is a perfect reference positioning surface.

Figure 2:
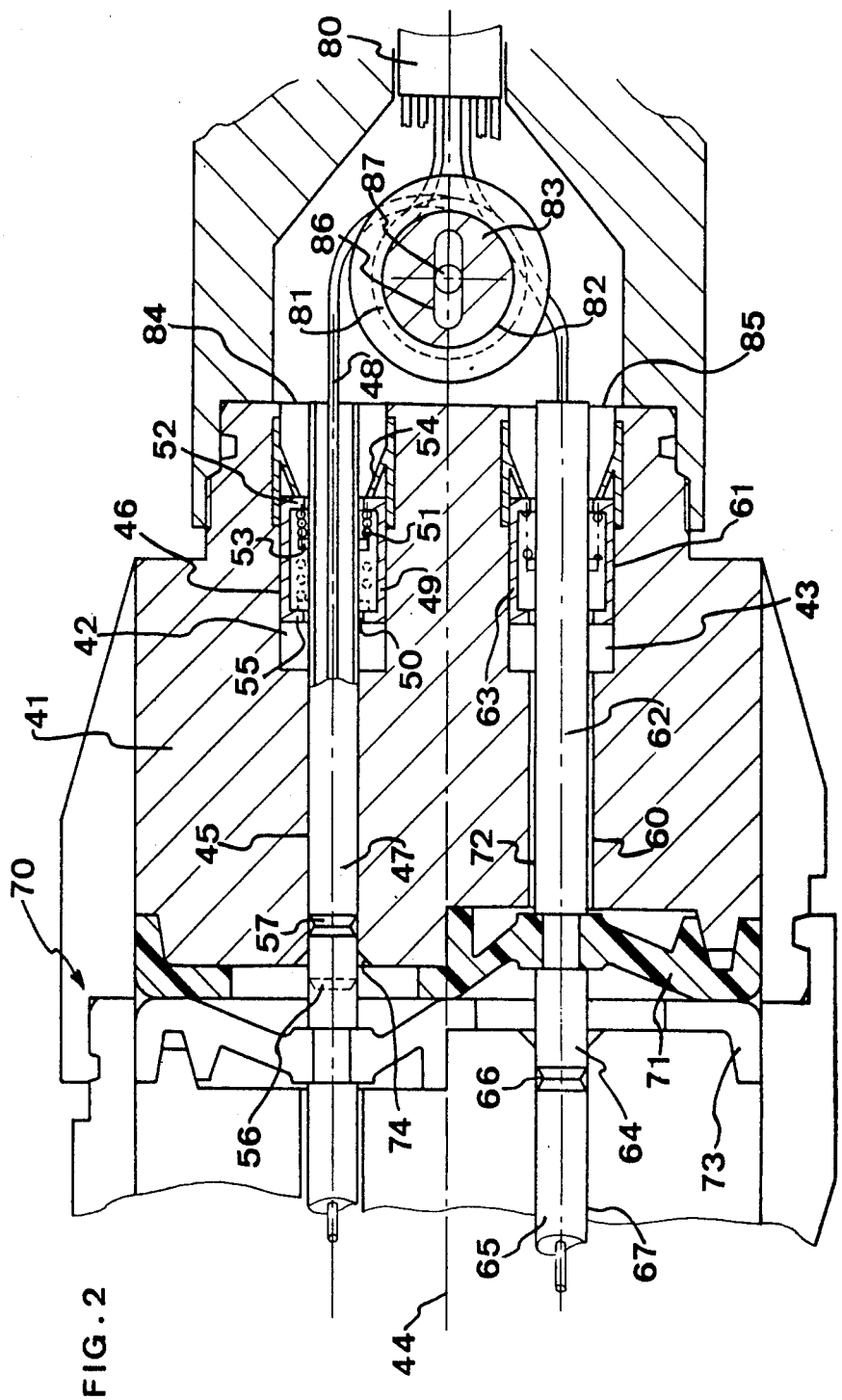
FIG. 2 represents an embodiment of a connector for two fibers of the hermaphroditic type coupled to another identical connector, this other connector being shown only partially to simplify the description.

On the other hand, the embodiment of the connector illustrated in FIG. 2 includes essentially a body member 41 consisting of a one-piece member in which are made at least two axial bores 42, 43 placed symmetrically in relation to an axis of symmetry 44.

More precisely, the axial bore 42 is delimited by two cylindrical surfaces of revolution 45, 46 having different diameters.

In this axial bore 42 is fitted a ferrule 47 supporting in a known manner a first optical fiber 48.

This ferrule 47 is delimited by an external surface of revolution having the same complementary diameter as the surface of revolution 45 of smaller diameter of the axial bore 42.

Similarly, in a known manner, this ferrule 47 is surrounded by a sleeve 49 with a certain clearance defined by a space 50, elastic linking means being provided between the sleeve 49 and the ferrule 47.

Very schematically, these elastic means are illustrated by a spring 51 bearing via one end 52 of the sleeve 49 and, on the other side, on a shoulder 53 integral with the ferrule 47.

This sleeve delimited by its external cylindrical surface of revolution is positioned in the part of the axial bore having the cylindrical surface of revolution of larger diameter 46 so that it is perfectly blocked against axial movement and, for this reason, the external surface of this sleeve has the same diameter as that of the part 46 of the axial bore 42.

This sleeve is blocked in position by any means and in particular by means of lugs represented schematically at 54 in the figure.

Moreover, the ferrule 47 cooperates with the sleeve 49 via these elastic means so that the latter can slide in the part 45 of the axial bore 42 between two limit positions.

A first limit position is determined when the spring 51 is perfectly relaxed and the shoulder 53 comes up against the end 55 of the sleeve 49.

In this position, the ferrule 47 emerges at least partially from the body member 41 as shown in dotted lines at 56 in the figure, of course when there is no obstacle at the exit of the axial bore.

On the other hand, the other limit position corresponds to a compression of the spring 51 which enables the end 57 of the ferrule to be placed inside the part 45 of the bore 42.

The advantage of such a structure will appear, notably during the description, when such a connector is connected with itself in a hermaphroditic manner. As stated previously, the one-piece body member 41 has a second axial bore 43 delimited respectively by two cylindrical surfaces of revolution 60, 61 to receive in a manner substantially identical to the axial bore 42 a ferrule 62 with a sleeve 63.

This axial bore 43 is capable of receiving a ferrule 62 substantially identical to the ferrule 47 with a sleeve 63 substantially identical to the sleeve 49.

More precisely, this means that the external surface of the ferrule 62 is strictly identical to that of the ferrule 47.

Similarly, the external cylindrical surface of revolution of the sleeve 63 is advantageously also identical to that of the ferrule 49 to cooperate perfectly with the cylindrical surface 61 of larger diameter of the axial bore 43.

On the other hand, the ferrule 62 has a greater length than the axial bore and emerges substantially from the latter, to an undetermined extent, the end of this ferrule appearing at 64 in the figure.

As previously, this ferrule 62 cooperates by elastic means with the sleeve 63 to be able to move between at least two limit positions in a manner to be explained below.

By contrast, and unlike the axial bore 42, the surface 60 of the axial bore 43 has a diameter slightly larger than the diameter of the axial bore 45 of smaller diameter and hence a diameter which is also greater than that of the ferrules 47 and 62.

In fact, as pointed out earlier, this structure makes it possible to give the connector a hermaphroditic character, i.e. as technicians say: it can be connected to itself.

Hence, in the left-hand part of the figure is shown the same connector having the same structure but positioned 180 degrees from the connector illustrated entirely and which was just described. This shows the advantage when two connectors are thus mated.

The emerging part 64 of the ferrule 62 can thus cooperate with the ferrule 65 opposite it and which is thus structually identical to the ferrule 47 cooperating with the surface 45. Hence, when the two connectors are brought together, the end 64 pushes back partially the part which emerges from the ferrule 65 so that the end 64 and the ferrule 65 abut perfectly at 66 and so that this separation surface between the two ferrules is located in the axial bore 67 which is identical to the axial bore 45.

Consequently, it is seen that the two ferrules abut perfectly and are kept perfectly in the reference surface 67.

Of course, if there were a slight construction misalignment between the ferrule 65 and the ferrule 62, because of the fact that the bore 60 has a diameter larger than that of the ferrule 62, the latter could move transversely to be inserted perfectly in the bore 67 and abut just opposite the ferrule 65.

As explained earlier, this is possible owing to the elastic links between the ferrules and the sleeves maintained in their reference surface.

Of course, as in any hermaphroditic connector, means are provided for blocking these two connectors and do not involve any design difficulty since they are currently used by those of the art.

As a guide, they have been shown partially in the figure at 70.

It is thus seen that this type of connector, particularly valuable for the connection of optical fibers, definitely has a large number of advantages. In particular, unlike electrical connectors, this type does not involve environmental problems as concerns the creation of electrical leaks for example capable of bringing about arcing and hence the destruction of the connectors.

This type of connector can consequently be used in any atmosphere and in any location. However, it is preferable to contribute to the extension of their service life by providing maximum protection against damage. For this purpose, it is seen that when the two connectors are not mated, the two ends of the ferrules, the ferrule 47 as well as the ferrule 64, emerge from the body member 41.

On the other hand, if the ferrule 47 mates perfectly by sliding against the surface of revolution 45, the ferrule 62 delimits, between the surface 60 and its external surface, a space through which extraneous matter may enter.

Consequently, to prevent such ingress, it is advantageous to provide a membrane 71 surrounding in a sealed manner the ferrule cooperating with the axial bore of larger diameter, in this case, the ferrule 62, and forming a sealed chamber surrounding the space 72 delimited between the external surface of this ferrule 62 and the surface 60 of the axial bore 43.

Furthermore, this membrane, made of a flexible material, can serve as a seal which can cooperate with the identical membrane 73 of the other connector to improve sealing and to prevent the penetration of extraneous matter into this connector.

It is to be noted that, owing to the perfect cooperation between the external surface of the ferrule 47 and the surface 45 of the axial bore 42, it is not necessary to provide a sealed passage, especially as, when the two connectors are disconnected, owing to the action of the spring 51, the end 56 of the ferrule 47 emerges from the body 41, pushing back any foreign matter which may be located at the orifice 74 of the axial bore 42.

Of course, for the connector just described and illustrated in the figure, the description covers only two ferrules associated with two optical fibers. However, it is quite evident that it could include a plurality of these pairs of ferrules provided that these are placed symmetrically in relation to an axis such as the one defined previously at 44. This would make it possible to obtain a hermaphroditic connector for optical fibers with several connection assemblies.

Finally, as indicated earlier, the ferrules, whatever their functions, are subjected to shifting movements when two connectors are mated.

It must be borne in mind that optical fibers are relatively fragile and that it is necessary to avoid subjecting them to excessive angulations in order to prevent their destruction.

For this purpose, each optical fiber emerging from the connector 80 forms a loop of 360 degrees, respectively 81 and 82 for the optical fibers cooperating respectively with the ferrules 47 and 42.

Consequently, when the ferrules are subjected to translations, the radii of curvature of these fibers are only very partially modified and certainly only by a value very clearly lower than that which would have existed if the fibers emerging from the connector 80 were inserted directly in the ferrules.

Moreover, this loop over a complete revolution makes it possible to prevent the tangling of the optical fibers. Finally, to favor these optical fiber loops, it is advantageous to use a mandrel 83 around which these loops will be defined.

In this manner, these loops will remain constantly in an almost circular form which is in fact the best means of maintaining a substantially constant radius of curvature.

Thus, this mandrel 83, consisting of a reel, is placed between the orifice of the cable 80 and the entrance 84, 85 of the axial bores 42, 43 provided in the body member 41.

Furthermore, it is quite evident that when the two connectors are mated in order to ensure optical continuity between the different fibers, as mentioned, the mandrels are subjected to translations when the fibers abut.

Of course, the loops 81, 82 as mentioned earlier may nevertheless have been excessively wrapped around the mandrel, and a poor connection can consequently occur.

To overcome these drawbacks but also to allow the mandrel, firstly, to retract inside the one-piece member and, secondly, to emerge therefrom when the two connectors are uncoupled, the reel 83 is advantageously mounted on a shaft 87 capable of cooperating by sliding in two grooves, for example 86, placed on each side of the reel and fixed in relation to the one-piece body member 41 in order to give this reel a degree of freedom in translation so that it can, depending on the different connection and disconnection operations, translate by itself in order, for example, to move toward or away from the body member 41 so that the movements of the ferrules mentioned above can take place freely without stress.

FIGS. 3 to 9 represent the same means in different forms making it possible to avoid excessive angulations or bends in the optical fibers and to allow the elongation and/or retraction of these fibers easily without breakage or deterioration by any cause whatever, mechanical pulling or due for example to thermal expansions. For this puropose, it is necessary first of all to review the configuration of an optical fiber cable.

Figure 3:
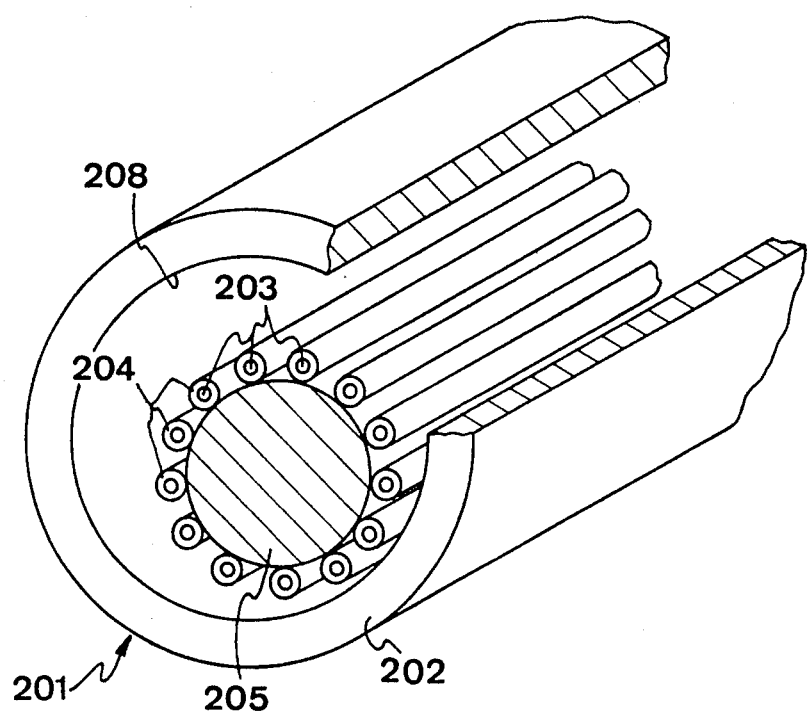
FIG. 3 represents, in a partially cut-away view, a table with a plurality of optical fibers as manufactured presently.

Let us examine more particularly FIG. 3 which represents in a sectional and partially cut-away view an embodiment of a cable with a plurality of optical fibers such as those currently found at the present time on the market.

This cable 201 has an envelope 202 of generally cylindrical form made of a material such as a rubberized resin, an elastomer, etc.

Inside this envelope 202 is placed a plurality of optical fibers 203 all surrounded by a sheath 204.

All of these optical fibers 203, 204 surround a core 205 and occupy a volume which can be very schematically likened to a cylinder whose diameter is clearly smaller than the inner diameter 208 of the envelope 202.

Up to now, this dimensional difference made it possible to compensate for variations in the length of the sheathed optical fibers 203, 204 by the fact that all of these fibers placed around a core 205 acquired corrugations within this envelope 202.

The aim of the present invention is to provide an apparatus capable of compensating for the variations in the length of all these optical fibers mounted around the core 205 without requiring an envelope 202 having an inner diameter clearly larger than the volume occupied by all the optical fibers 203, 204.

Figure 4:
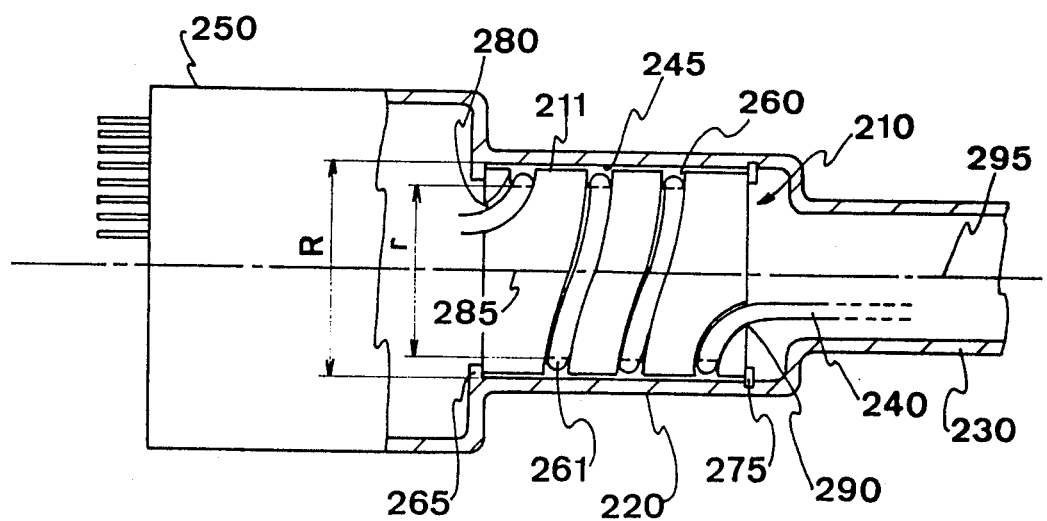
FIGS. 4, 5A, 5B, 6, 7, 8A, 8B and 9 represent different advantageous embodiments of an apparatus making it possible to compensate for the length variations of at least one sheathed optical fiber placed in a jacket.

Before describing the different advantageous embodiments of the apparatus, the present description will refer only to a single optical fiber so as to simplify the drawings and in order to allow easier understanding of the structure of the apparatus and its operation. It is quite evident that without any difficulty those of the art will be able to adapt this apparatus to a plurality of optical fibers. In this spirit, FIG. 4 represents a first embodiment of such an apparatus.

This apparatus includes a mandrel 210 placed in an envelope 220 which may be a continuity of the envelope 230 surrounding an optical fiber 240 itself surrounded by a sheath.

This envelope 220 is, in this embodiment, associated for example with a male connector 250 for optical fibers well known in itself.

The mandrel 210 is fixed in relation to the envelope 220 and has, on its periphery 211, a helical groove 260 forming several turns on the lateral periphery 211 of the mandrel 210 such that the ends 280, 290 of this groove lead out on each side of this mandrel 210.

The fiber 240 has generally a diameter of a certain value well known to those of the art. For this purpose, the groove 260 is designed such that it has a depth clearly greater than the diameter of the optical fiber 240.

In the arrangement shown in FIG. 2, the optical fiber 240, which is connected to the connector 250, is placed in the groove 260 of this mandrel so that it forms a certain number of turns.

This optical fiber 240 is placed at the bottom 261 of this groove 260 when the optical fiber has its minimum length.

Thus, when variations in the length of this fiber 240 occur, notably due to corresponding variations in temperature which, in the case considered should allow the optical fiber only to become elongated, these variations are compensated by an increase in the diameter of the turns of the optical fiber 240.

This increase in diameter will be possible to a maximum extent so that these turns come substantially into contact with the inner surface 245 of the envelope 220.

Those skilled in the art will be able to calculate easily the depth of this groove 260 and the number of these turns so that, during variations in the diameter of these turns, this apparatus can compensate and absorb all the possible variations in the length of the fiber 240.

In fact, this maximum compensation is checked easily by the formula $2.(R-r).x$ in which R represents the inner diameter 245 of the envelope 220, and r the minimum diameter of the groove 210 (which is assumed to be cylindrical), x being the number of revolutions or wraps possible for the optical fiber 240.

In this embodiment, the shaft 285 of the mandrel coincides substantially with the axis 295 of the envelopes, 220, 230, and the groove 260 has its helical form around the axis 285, 295.

Figure 5A:
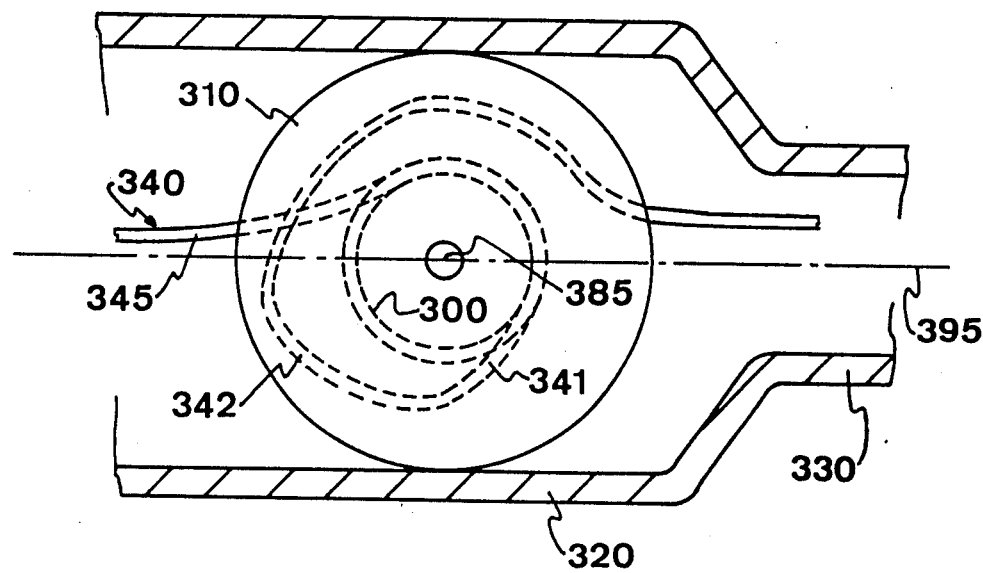
Figure 5B:
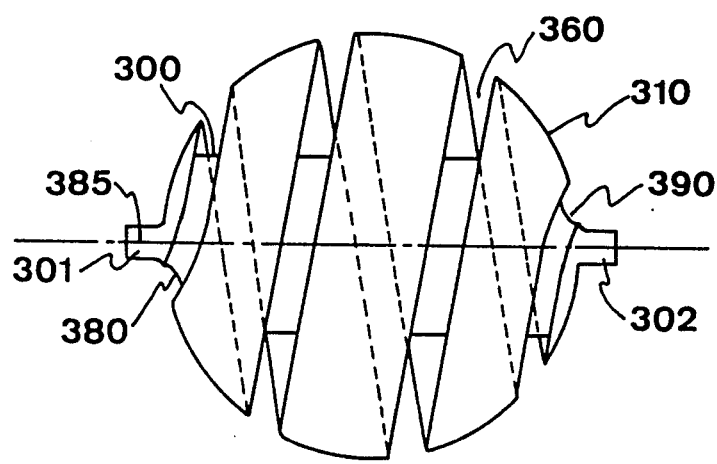

FIGS. 5A and 5B represent another embodiment of an apparatus which, in principle, is identical to that of FIG. 4 but, in this case, the mandrel 310 is placed in the envelope 320 and takes on the general form of a sphere in which is made a groove 360 whose two ends 380, 390 are located substantially on an axis 385 which is substantially perpendicular to the axis 395 of the envelopes 320, 330.

FIG. 5A represents, in longitudinal section, the apparatus in which the optical fiber 340 forms substantially a plurality of turns 341 which are guided in the groove 360 in which it is seen that a part 342 of these turns is away from the bottom 300 of this groove 360.

The representation of the form of the wraps of the fiber 340 around the mandrel 310 suggests, since a part of these wraps is not placed flat, on the one hand, against the bottom 300 of the groove 360 and, on the other hand, against the inner surface of the envelope 320, that the fiber 340 has an average length and that it can, depending on temperature variations, either shrink or become elongated without this harming the position of the emerging part 345 of the fiber 340 which, in the embodiment, may be regarded as the part of the fiber 340 represented in the left-hand part of FIG. 5A.

In these two embodiments according to FIGS. 4, 5A and 5B identical in principle, the two mandrels will be fixed suitably in relation to their respective envelopes 220 and 320 and more particularly in the case of FIG. 2, the mandrel will be positioned between two stops 265, 275, one of which (265) may be permanent and the other consist of a clip 275.

On the other hand, in the case of the mandrel according to FIG. 3, the latter can be held by means of bearings 301, 302 obtained in cooperation with the wall of the envelope 320.

Figure 6:
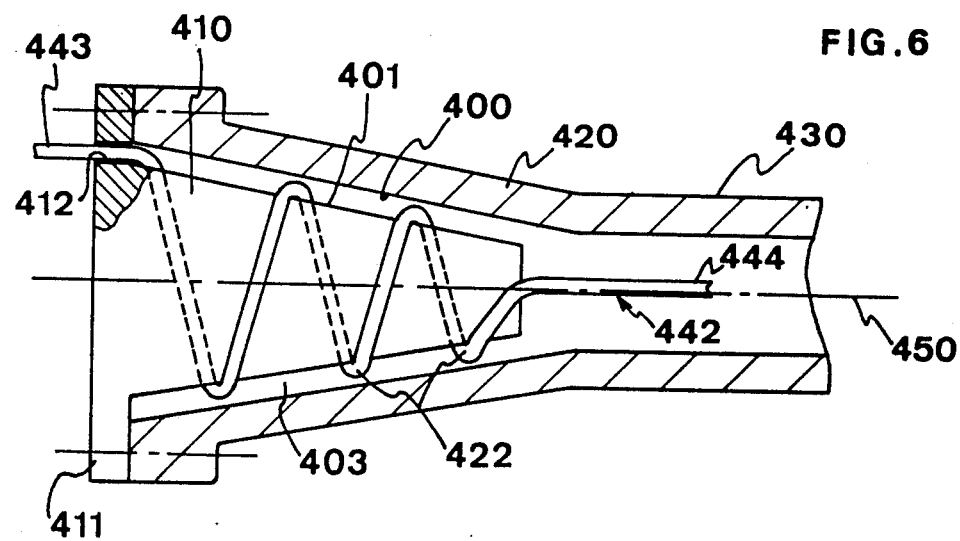

FIG. 6 represents another embodiment of an apparatus according to the invention which comprises essentially a mandrel 410 placed in an envelope 420 such that the inner surface 400 of the envelope 420 defines, with the outer conical surface 401 for the mandrel 410, a space 403 of annular truncated form, having a thickness substantially greater than the diameter of the fiber 442. The mandrel 410 is secured solidly to the envelope 420 by means of a bottom 411.

This bottom 411 has an opening 412 allowing the passage of the optical fiber 442 which can be connected to the connector as explained for example in FIG. 2.

The fiber 442 is thus placed inside this envelope and around the mandrel such that it emerges partially 443 through the orifice 412 and forms, around this mandrel 410, a certain number of wraps 422 and such that its other end 444 is directed toward the long envelope 430, i.e. in fact the optical fiber cable. In this way, it may be considered that the end 443 of the fiber is relatively fixed in relation to the bottom 411 but that, by contrast, the end 444 can undergo displacements owing to variations in the length of the optical fiber as stated previously, due for example to temperature variations.

In this case, as the thickness of the space 403 between the mandrel 410 and the envelope 420 is slightly greater than the diameter of the fiber, the fiber can slide relatively freely around the conical part 401 of the mandrel 410 even for large variations in length. Owing to the helical form of these wraps which will be placed one over the other, the variation in length can be compensated by new wraps forming around the mandrel 410.

Figure 7:
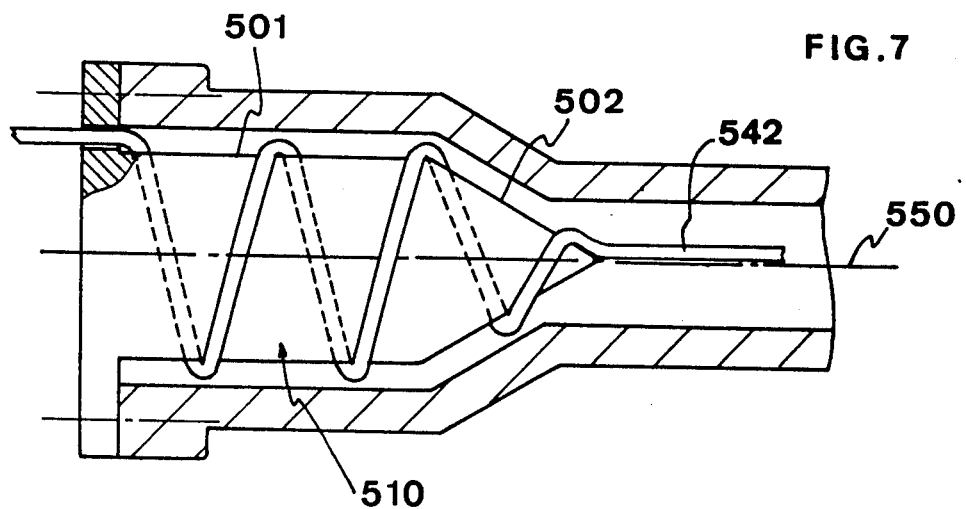

Those of the art will of course be able to determine the value and in particular the length of the mandrel 410 so that it can absorb all the possible variations in length under given conditions, this determination not presenting any difficulty. FIG. 7 represents another embodiment of an apparatus substantially identical in its principle to the one shown in FIG. 6 but, in this case, the mandrel 510 is delimited by two surfaces, respectively a cylindrical surface 501 terminated by a conical surface 502.

This apparatus offers one advantage over the preceding. It makes it possible to have, on the length of the cylindrical surface 501, a larger wrap diameter which provides a greater compensation for the variations in the length of the optical fiber 542 over a shorter length.

Consequently, the essential advantage of the apparatus according to FIG. 7 in relation to the apparatus according to FIG. 6 is that, for the same possible optical fiber length variation, the length of the mandrel along the axes 450 (FIG. 6) and 550 (FIG. 7) respectively will be shorter in the case of the embodiment of FIG. 7 than in that of FIG. 6.

In the embodiments illustrated above, the compensations for the variation in the length of the sheathed optical fiber compared with the envelope surrounding this fiber result essentially from the fact that this excess length of the optical fiber is positioned around a reference surface, designated essentially around the mandrel, such that the fiber moves away from this mandrel or wraps itself around the mandrel.

In certain embodiments, the fiber can even be guided by grooves.

FIG. 6 represents an embodiment in which the excess length of optical fiber is wound around a mobile mandrel capable of swiveling around an axis under the action of different means, essentially as illustrated in the embodiment by a return spring.

Figure 8A:
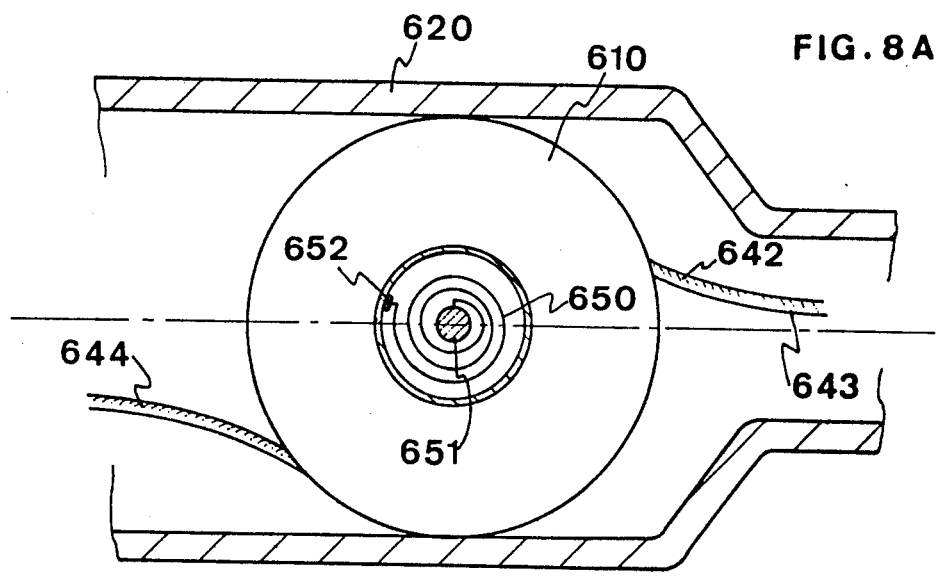
Figure 8B:
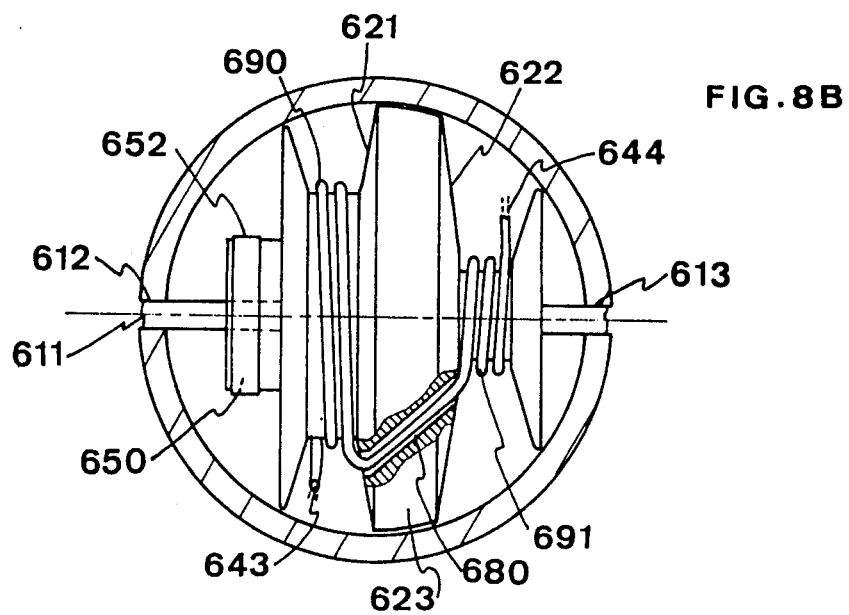

More precisely, the apparatus represented in FIG. 8 comprises an envelope 620, a mandrel 610 mounted swivelably around a shaft 611 resting on bearing 612, 613 made for example in the wall of the envelopes 620.

This mandrel is made up essentially of two juxtaposed reels 621 and 622 having respectively different diameters in the illustrated embodiment.

Thus, the fiber 642 is wound in a first direction around the first reel 622 and then goes, for example, through the middle wall 623 in a conduit 680 to continue to wrap around the reel 621 but in a direction opposite the winding direction of the fiber on the reel 622.

In the illustrated embodiment, the reel 621 has a diameter larger than that of the reel 622. Consequently, the end 643 of the optical fiber emerging from this reel 622 will be the optical fiber which has a length much greater than the length toward which is turned the end 644 of the optical fiber 642.

Further, the apparatus comprises a return spring 650 which is fixed at one of its ends 651 on the shaft 611 and at its other end 652 on the mandrel 610. Consequently, if a reduction in length occurs on the optical fiber 642, this would be equivalent to exerting, respectively on the ends 643 and 644 of this optical fiber 642, a pulling force tending to unwind it respectively from the two reels 621 and 622 provided in the mandrel 610.

It is thus understood why the two reels are wound in opposite directions, this making it possible for the two parts of the optical fiber (690 in reel 621, and 691 in reel 622) to unwind when the mandrel 610 turns in a single direction. In this hypothesis, i.e. where the optical fiber 642 tends to unreel, the return spring 650 is tensioned to store elastic energy which will be restored when, for example, the optical fiber 642 has the opposite tendency, becoming elongated.

Since the spring is tensioned, the mandrel will be imparted a rotating motion to rewind the excess length of optical fiber having become elongated.

Of course, if the optical fiber lengths on each side of this mandrel are substantially equal, the diameters of the reels 621 and 622 will then be substantially equal.

On the other hand, the largest reel diameter is associated with the shortest optical fiber length. In fact, the diameters of the reels are substantially inversely proportional to the fiber length to be compensated.

Figure 9:
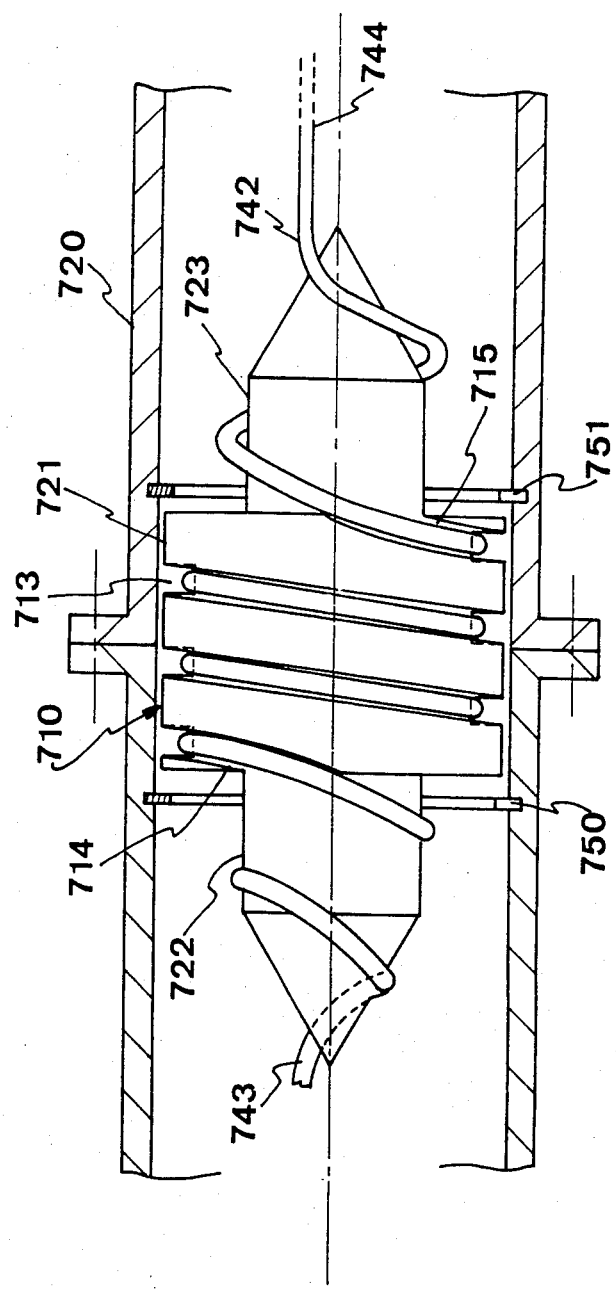

Finally, FIG. 9 represents another embodiment of an apparatus making it possible to compensate for variations in the length of at least one sheathed optical fiber 742 in relation to an envelope 720.

This apparatus finds a particularly advantageous application in cables of very long length. It can be placed in a spaced-out manner along the length of these cables so that these length variations, as described above, can be compensated.

FIG. 9 represents very schematically one of these apparatus placed in a cable. It is composed essentially of two parts, a first part 721 comprising means for positioning and maintaining the optical fiber with a relative rigidity, and a second part 722 and 723 allowing the compensation of length variations. This apparatus thus includes a mandrel 710 having essentially the two cylindrical parts 721 and 722, 723 of different diameter, the cylindrical part 721 being located substantially the two cylindrical surfaces 722, 723.

This cylindrical part 721 also includes a continuous groove 713 whose two ends 714 and 715 lead out on each side of this cylindrical surface 721 at the level of the cylindrical surfaces of smaller diameter 722, 723.

The optical fiber 742 is then placed on this mandrel 710 so that it forms a certain number of wraps respectively around the two parts of the cylindrical surfaces, 722, 723 on each side of the cylindrical surface 721 while running in the groove 713.

Hence the optical fiber 742 is kept substantially in the cylindrical part 721 much like the dead turns on a capstan. On the other hand, the two parts of the cylindrical surface 722, 723 make it possible to absorb the fluctuations in the length of the two sides 743, 744 of the optical fibers 742 in relation to this mandrel 710 as explained for example with respect to the apparatus illustrated in FIGS. 6 and 7.

This mandrel 710 will of course be positioned in the sheath 720 so that it is maintained between two stops 750 and 751 obtained for example by means of clips so as to be able to slide laterally slightly and position the mandrel in the envelope 720 in relation notably also to the fiber 742.

Hence, an optical fiber cable of the same type as represented in FIG. 3 can include a plurality of such apparatus distributed repetitively along this cable and it is now possible to design very long optical fiber cables, hitherto not possible owing to the significant variations in the length of sheathed optical fibers.

In the connectors described and illustrated above, it is necessary to provide optical fiber connection terminations capable of sliding in the sleeve. It is quite evident that the termination comprises the ferrules described above.

Figure 10:
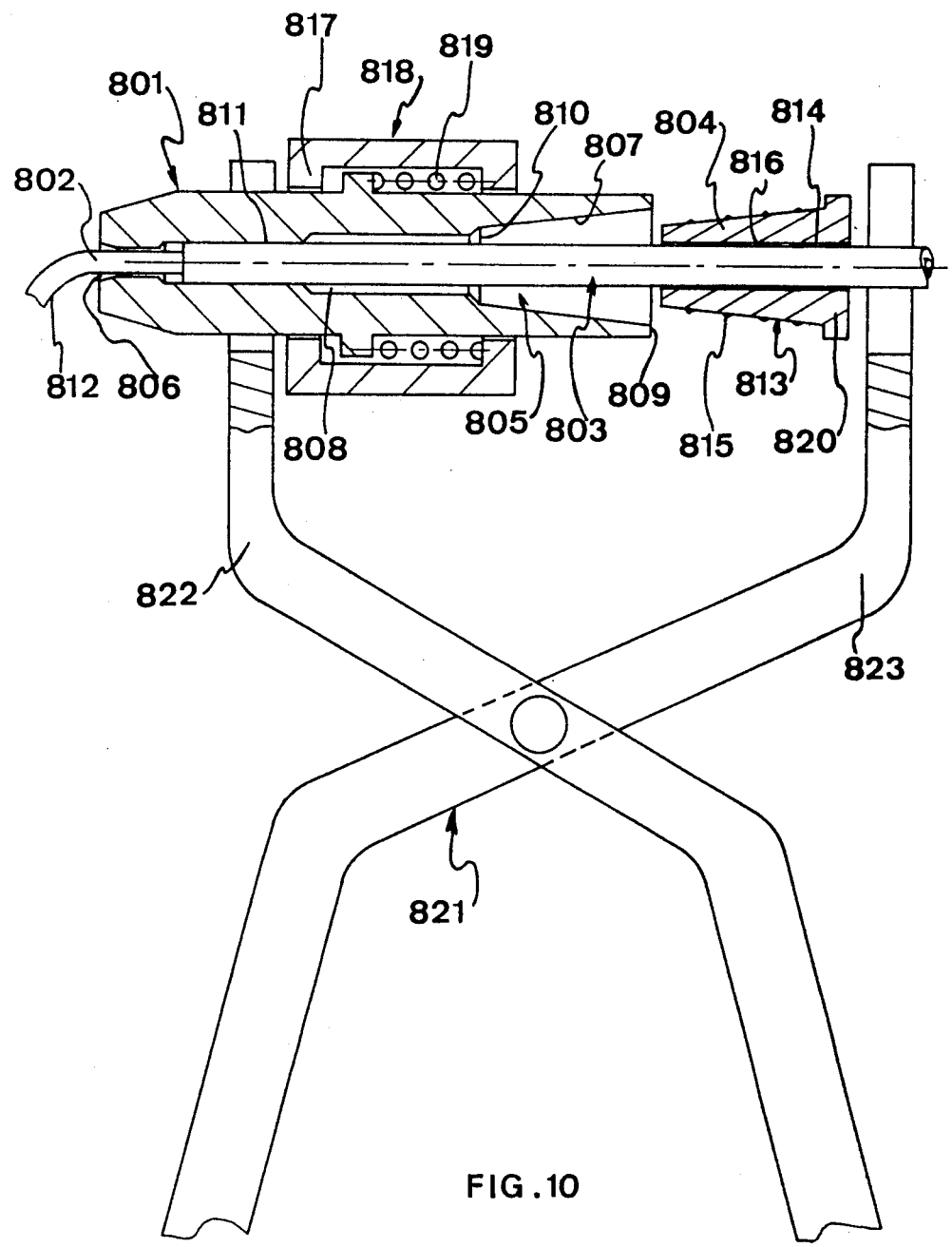
FIGS. 10 and 13 represent two views illustrating the implementation of the method for making an optical fiber termination according to the invention.

FIG. 10 represents different elements entering into the implementation of the method to obtain an optical fiber termination. These means comprise essentially a ferrule 801, an optical fiber 802 surrounded by a sheath 803 made of a relatively flexible material and a wedge 804.

More specically, the ferrule 801 made in a substantially cylindrical form of revolution has an axial bore 805 running entirely through the ferrule and leading out to the two ends respectively 806 and 807 with a middle part 808.

The first end 806 has a section slightly larger than that of the bare fiber 802, i.e. the fiber without the sheath 803 on part of its length. On the other hand, the second end 807 of the axial bore 805 has a section which flares out continuously so that it has its largest value on the outside. More specifically and in an advantageous embodiment, this end is delimited by a conical surface or cone portion whose large base is turned outward to form the outer part 809 while the small base 810 is turned toward the inside of the axial bore 805. In any case, the section of this end 807 is always larger than the largest of the sections of the sheath 803 surrounding the optical fiber 802. Finally, the intermediate part 808 may have any section whatever but advantageously, on one part 811, a section equal to or nearly equal to the section of the sheath 803 of the fiber 802.

In this axial bore 805 is then inserted the fiber 802 with its sheath 803 so that the bare part 812 of the end of the optical fiber 802 is located in the first end 806 of the axial bore 805 and moreover so that at least part of the sheath 803 is located in the end 807. Advantageously, the optical fiber will be sufficiently inserted into the axial bore so that at least part of the sheath is positioned in the middle section 808 and more specically at the level of the portion 811, thereby being held relatively.

Furthermore, around the sheath 803 is inserted a wedge 804 whose outer surface 813 has a form which is substantially complementary to the surface of the second end 807 of the axial bore 805 and a transverse bore 814 slightly larger than the section of the fiber 803. Advantageously, this wedge 804 has asperities 815 over its outer surface 813, as does the bore 814, notably the asperities 816 whose functions will be explained below.

Thus, the wedge 804 is placed around the sheath 803 in a position from which it can be introduced into this end 807. To accomplish this, the ferrule 801 has shoulder means 817 made, for example, on a sleeve in the illustrated embodiment, whose function is not specifically to provide this shoulder but more precisely to allow the positioning of the ferrule 801 in a more complete connector system. This use of the sleeve 818 associated with elastic means 819 will not be described further here because it is already well known and does not enter into the implementation of the present invention.

Furthermore, the wedge also has thrust means 820 consisting for example of a flange located on the outside of its largest section. Thus, when the different elements are positioned as shown in FIG. 10, i.e. the fiber and the sheath placed in the axial bore 805 of the ferrule 801, the wedge 804 ready to be introduced into the end 807, a pair of pliers 821 with two branches 822 and 823 is positioned so that the two branches 822 and 823 in the form of a U surround respectively the ferrule 801 and the sheath 803 to bear respectively on the shoulders 817 and 820. The pliers, shown schematically, are closed so that the two branches 822 and 823 exert opposite forces on these shoulders tending to bring the wedge 804 and the ferrule 801 together. Under the action of these forces, the wedge 804 penetrates into the end 807 until the asperities 815 come into contact with the wall of the end 807.

Then, a light additional force is inserted so that, on the one hand, these asperities 815 come into full contact with the surface of the end 807 and, on the other hand, the wedge 804 tends to be squeezed so that the asperities 816 of the bore 814 penetrate into the sheath 803. Thus, once the wedge is perfectly inserted, it makes it possible to secure perfectly the sheath and the fiber in this sheath in relation to the ferrule 801.

Once these operations are completed, the pliers can be removed.

Finally, one need then only secure the end 812 of the optical fiber 802 to the ferrule 801, for example by means of a strong glue, cut the end projecting from the axial bore 805 and give it an optical finish in a known manner to allow the coupling and the proper transmission of optical information.

Figure 11:
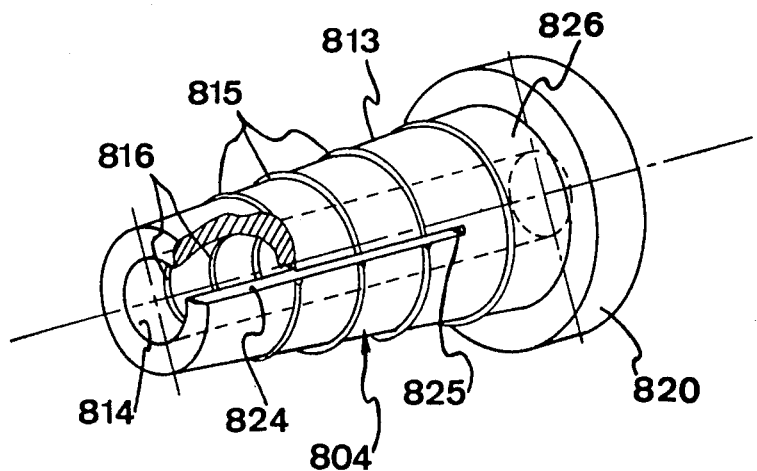
FIG. 11 represents, in a partially cut-away perspective view, an embodiment of one of the specific means of the optical fiber termination according to the invention.

FIG. 11 represents an advantageous embodiment, in a partially cut-away perspective view, of a wedge 804 with its flange 820. This wedge has an exterior form matching substantially the end of the ferrule into which it is to be inserted and has asperities, for example in the form of sharp rings 815 projecting from its outer surface 813. Similarly, the internal bore 814 also has projecting asperities 816 designed to bite into the sheath 803. Advantageously, this wedge 804 is made of a material which is relatively rigid but nevertheless exhibiting a certain flexibility enabling it to deform so that the asperities 816 can penetrate the sheath. To facilitate this closing of the wedge 804 on the sheath, it has a longitudinal slot 824 running over at least a part of its surface having the smallest section on a length which is sufficient but smaller than the length of the end 807. This makes it possible to keep a part 826 of the wedge 804 much more rigid so that it can be applied fully against the wall of this end 807 while the end carrying the slot 824 can close in easier to allow these asperities 816 to penetrate the sheath 803.

Figure 12:
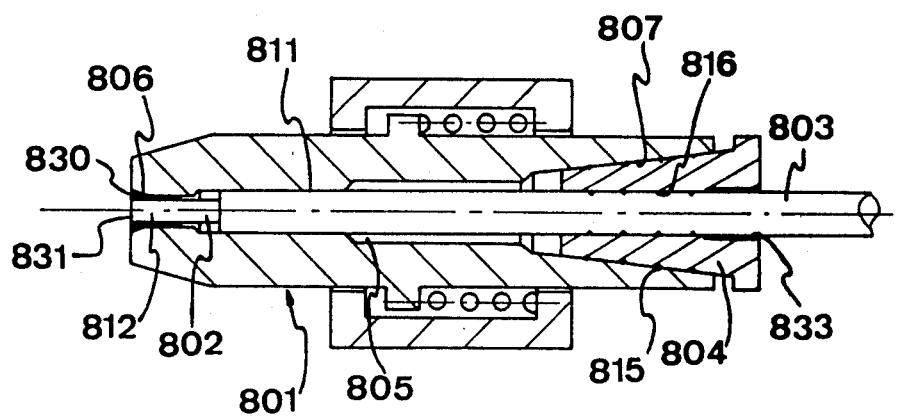
FIG. 12 represents, in section, a finished embodiment of an optical fiber termination according to the invention.

FIG. 12 represents a completed optical fiber termination in which the end of the optical fiber 812 is maintained in the end of the axial bore 806 by an adhesive 830 applied between the ferrule 801 and the fiber 802. For its part, the sheath is held in the middle part 811 of the axial bore 805, matching it perfectly. The wedge 804 is positioned in the end 807 of the axial bore 805 and the different peripheral and internal asperities 815 and 816 respectively are in contact with the walls of the sheath 803 and the end 807, having penetrated into them. One thus sees the advantage of this embodiment. It makes it possible, when the sheath 803 is accidentally pulled, to prevent the extraction of the sheath from the ferrule 801 and the dislodging of the end 812 of the fiber 802 from the end 806 of the ferrule 801.

Similarly, as the ferrule 801 is generally made of a rigid and hard material, it is observed that with this embodiment the sheath 803 is not in direct contact with the ferrule 801 but is connected to it by the wedge 804 which is made of a flexible-rigid material. This makes it possible, in the event of accidental twisting of the fiber 803 at the level of the passage 833 constituting the outlet of the wedge 804, for the wedge to deform slightly but sufficiently to prevent damage to the fiber 802 contained in its sheath 803, notably at the level of this passage 833.

In the embodiment described above, the end 812 of the optical fiber is positioned in relation to the ferrule 801 by means of the adhesive 830. It is only after this operation that the part of the fiber projecting from this ferrule is cut and its end face 831 polished to an optical finish as required. In certain manufactures, the end of the fiber is cut before it is inserted into the ferrule, moreover whether or not its end face 831 is optically polished. It is then understandable in this case that the fiber must be correctly positioned in the ferrule, particularly when the wedge 804 is introduced into the end 807 of the axial bore of the ferrule, because for certain applications it is preferable to position this end 812, notably by means of the adhesive 830, after having introduced this wedge 804.

Figure 13:
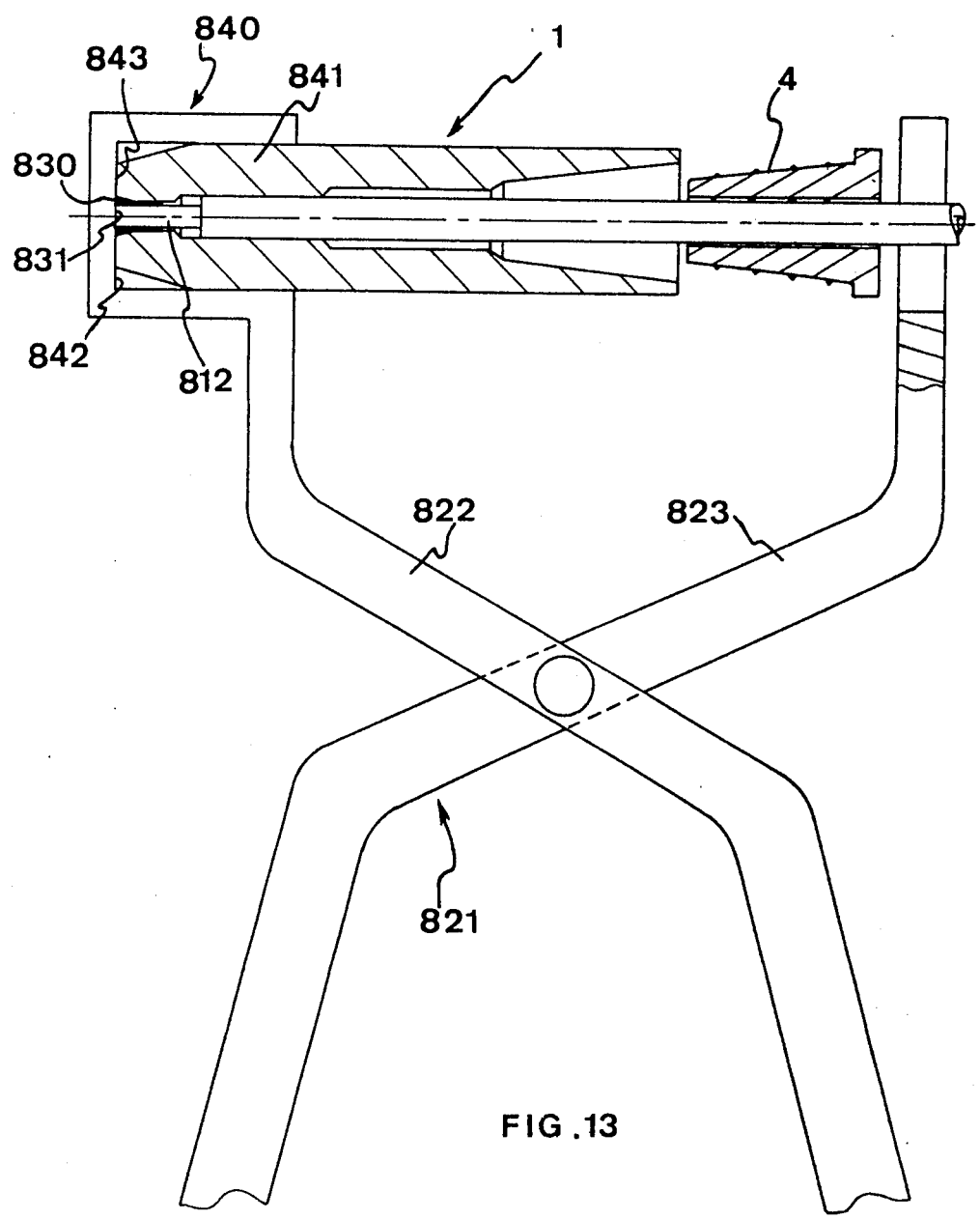

The apparatus for implementing this particular embodiment of the method is represented more particularly in FIG. 13 and makes it possible to complete the termination of this optical fiber correctly and without difficulty while complying with these conditions.

In this embodiment, the pliers 821 have two branches 822 and 823 as described earlier but, more particularly in this case, the branch 822 ends in a receptacle 840 into which can be inserted and positioned the end 841 of the ferrule 801, notably the end from which the face 831 of the optical fiber 802 emerges.

This receptacle 840 has a bottom reference surface 842 against which bears the face 843 of the end 841 of the ferrule 801.

Of course, these two faces will be designed in accordance with the requirements of optical fiber connector technology but generally they will be flat faces. In any case, this surface 842 at the bottom of the receptacle 840 has a function. Firstly, it makes it possible to apply to the ferrule 801, on its face 843, the force necessary for bringing together the ferrule and the wedge 804 as described earlier. Secondly, it defines a reference plane so that the end 831 of the fiber 802 is perfectly positioned. Thus, when the two branches 822 and 823 of these pliers 821 are closed, the wedge penetrates as described earlier in order to squeeze the sheath 803 of the fiber 802 at the level of the end 807 of the ferrule 801. However, in this case, the end 812 of the fiber 802 remains perfectly positioned, at least as concerns its end face 831.

It is then sufficient, if called for by design requirements, to apply the adhesive 830 in order to fix the position of this face 831 in relation to the ferrule 801.

In this FIG. 13, as in FIG. 10, pliers of the manual type have been shown. It is however readily understood that this was done to simplify the drawing and to permit better understanding of the implementation of the method. By pliers is meant any means having the functions described above, whether manual or automatic.

What is claimed is:

1. Connector for two optical fibers comprising at least one body composed of a one-piece member in which is provided an axial bore, and a ferrule supporting an optical fiber in said bore, wherein said one-piece member has its axial bore defined by two coaxial cylindrical surfaces of revolution having different diameters, two (first and second) ferrules supporting in an internal bore the said two fibers respectively, these two ferrules each being delimited respectively by an external cylindrical surface of revolution complementary to that of the one-piece member having the smaller diameter, at least one first sleeve mounted around a first of said ferrules with a certain clearance, first elastic linking means between said sleeve and said first ferrule, said sleeve being delimited externally by a cylindrical surface of revolution complementary to that of said body member having the larger diameter, these two ferrules being introduced into said body member such that, firstly, they are positioned at least partially in said axial bore of smaller diameter and, secondly, such that the sleeve is placed in said axial bore of larger diameter.

2. The connector claim 1 wherein said two ferrules and said two sleeves are identical.

3. The connector of claim 1 further comprising means for locking at least one of said sleeves in place.

4. The connector of claim 1 wherein said body and said sleeves are made of materials having identical or similar expansion coefficients.

5. The connector of claim 1 wherein said body comprises a second axial bore delimited by at least a third cylindrical surface of revolution and a third ferrule delimited by an external cylindrical surface of revolution of the same diameter as said first and second ferrules, the diameter of said third surface being greater than that of said third ferrule, said third ferrule being slidable in said second bore.

6. Connector of claim 5 wherein said third ferrule is linked with said body by elastic means.

7. The connector of claim 5 wherein said third ferrule has a length greater than said third cylindrical surface of said second bore so that it emerges from the latter to a certain extent.

8. The connector of claim 5 wherein said first ferrule can slide in said first axial bore between two limit positions, a first position in which said ferrule emerges substantially from said first bore and a second position in which said end of said ferrule is set back in said axial bore.

9. The connector of claim 8 wherein said third ferrule emerges by a length substantially equal to the distance by which said first ferrule can be set back in said first bore.

10. The connector of claim 5 further comprising a sealed flexible passage membrane surrounding said third ferrule, said sealed membrane forming a sealed chamber between said body member and the inside of said second axial bore.

11. The connector of claim 1 wherein parts of said fibers emerge from said ferrules and suitable for connection each form a complete loop.

12. The connector of claim 11 wherein said loops are placed around a mandrel.

13. The connector of claim 12 wherein said mandrel is connected to said one-piece body member by means ensuring it a degree of translation freedom.

14. The connector of claim 15 further comprising at least one mandrel, a wrap of sheated optical fiber surrounding a surface portion of said mandrel, and means for positioning the part of said optical fiber forming said wrap at the level of the mandrel around said surface portion.

15. The connector of claim 14 wherein said means consist of a space between said surface portion of said mandrel and said envelope, said space having a thickness substantially greater than the thickness of said optical fiber.

16. The connector of claim 15 wherein said optical fiber is guided in said space in a groove formed around said mandrel.

17. The connector of claim 14 wherein said surface portion of said mandrel is cylindrical.

18. The connector of claim 14 wherein said surface portion is conical.

19. The connector of claim 14 wherein said surface portion is made up of two adjacent surfaces respectively cylindrical and conical.

20. The connector of claim 14 further comprising means for assembling said mandrel in said envelope.

21. The connector of claim 20 wherein said assembly means comprise a rotation shaft capable of cooperating with a bearing respectively on one of the two elements constituted by said envelope and said mandrel.

22. The connector of claim 20 wherein said assembly means consist of two stops a mandrel capable of sliding in said envelope by at least a portion of its external surface between said two stops limiting its travel.

23. The connector of claim 14 wherein said mandrel has at least two surface portions around which can wind portions of turns of said optical fiber.

24. The connector of claim 23 wherein said two surface portions are separated by a middle wall in which is provided a groove.

25. The connector of claim 23 wherein said two surface portions are constituted respectively by two reels, said optical fiber being wrapped at least partially respectively around the two reels in two opposite directions, and elastic means acting on said mandrel to bring it back to a predetermined position.

26. Method allowing the connection of at least one optical fiber surrounded by a relatively flexible sheath to a ferrule comprising:
making in said ferrule a first axial bore, a first end of which has a section slightly larger than that of said fiber, and the second end of which has a continuously evolving section larger than the maximum section of the sheath,
removing part of said sheath on one end of said fiber to bare an end of said fiber,
introducing said fiber with said sheath into said axial bore so that the bared end is located in said first end and said fiber covered with its sheath is in said second end of said axial bore,
securing the bared end of said fiber with said ferrule, and
inserting into said second end a wedge surrounding said sheath, said wedge having an external shape substantially complementary to that of said second end, said wedge being inserted into said second end by squeezing, at least partially, a sleeve to clamp it and secure it to said ferrule.

27. Apparatus for implementing the method of claim 26, comprising means for bearing against said ferrule, means for bearing against said wedge and means for exerting two forces in opposition tending to bring said ferrule and said wedge together;
said means for exerting two forces in opposition tending to bring said ferrule and said wedge together consisting of pliers with two branches, said branches having a form making it possible to bear on bearing means; one of said branches having the form of a receptacle capable of receiving the end of said ferrule which maintains said bared end of said fiber, the bottom of said receptacle having a reference surface for the position of the end face of said optical fiber, and bearing on the end face of the ferrule.

28. Termination for optical fiber surrounded by a sheath, comprising a ferrule having an axial bore having one end formed with a section slightly larger than said fiber and the other end having a continuously evolving section larger than the section of said sheath, said fiber having a bared end, said bared end being placed in said axial bore at the level of the first end and part of said fiber surrounded with its sheath being located at the level of said second end, a wedge surrounding said sheath located in said second end of the axial bore, said wedge having an external section complementary to that of said second end and a second axial bore going through said wedge, surrounding said sheath, said wedge bearing on the wall of the axial bore while squeezing at least partially the sheath to keep it together with the ferrule.

29. The termination of claim 28 wherein said wedge has an external form substantially in the shape of a cone portion.

30. The termination of claim 28 wherein said wedge has asperities on its external periphery.

31. The termination of claim 28 wherein said second axial bore of said wedge has asperities.

32. The termination of claim 28 wherein said wedge is made of a relatively flexible material.

33. The termination of claim 32 wherein said wedge has a longitudinal slot over at least part of its height.

34. The termination of claim 28 wherein said wedge has at least a projecting bearing flange at its larger end.

35. An optical fiber cable comprising at least one apparatus according to claim 1 and further comprising an envelope, a mandrel made up of three substantially cylindrical coaxial parts, and two lateral parts of substantially cylindrical and/or conical form having a diameter smaller than the inner diameter of said envelope, a middle part between said two lateral parts having a diameter substantially equal to the inner diameter of said envelope, said lateral part comprising a continuous groove leading out on each side respectively to said two lateral parts.

36. The connector of claim 1 or 35 wherein said axial bore is designed on at least one of its ends in the shape of a funnel.

37. Connector for two optical fibers comprising at least one body composed of a one-piece member in which is provided an axial bore, and a ferrule supporting an optical fiber in said bore, said one-piece member having an axial bore defined by two coaxial cylindrical surfaces of revolution having different size diameters, two ferrules supporting in an internal bore said two fibers respectively, said two ferrules each being delimited respectively by an external cylindrical surface of revolution complementary to that of the one-piece member having the smaller diameter, at least one sleeve mounted around said first ferrule with a clearance therebetween, first elastic linking means between said sleeve and said first ferrule, said sleeve being delimited externally by a cylindrical surface of revolution complementary to that of said body having the larger diameter, said two ferrules being introduced into said body member such that, firstly, they are positioned at least partially in said axial bore of smaller diameter and, secondly, such that said sleeve is placed in said axial bore of larger diameter and a second sleeve surrounding at least said second ferrule, second elastic linking means between said second sleeve and said second ferrule, and means for positioning said second sleeve in relation to said body.

38. The connector of claim 37, wherein said two ferrules and said two sleeves are identical.

39. The connector of claim 37, further comprising means for locking at least one of said sleeves in place.

40. The connector of claim 37, wherein said body and sleeves are formed of materials having substantially identical coefficients of expansion.

41. The connector of claim 37, wherein said body comprises a second axial bore defined by at least a third surface of revolution and a third ferrule defined by an external cylindrical surface of revolution of the same diameter as said first and second ferrules, the diameter of said third surface being greater than the diameter of said third ferrule, said third ferrule being slidable in said second bore.

42. The connector of claim 41, wherein said third ferrule is linked with said body by elastic means.

43. The connector of claim 37, wherein the parts of said fibers which emerge from said ferrules and are suitable for connection form a complete loop.

* * * * *